Jan. 3, 1967  W. J. HIRTREITER  3,295,378
ACCELEROMETER
Filed July 30, 1962  2 Sheets-Sheet 1
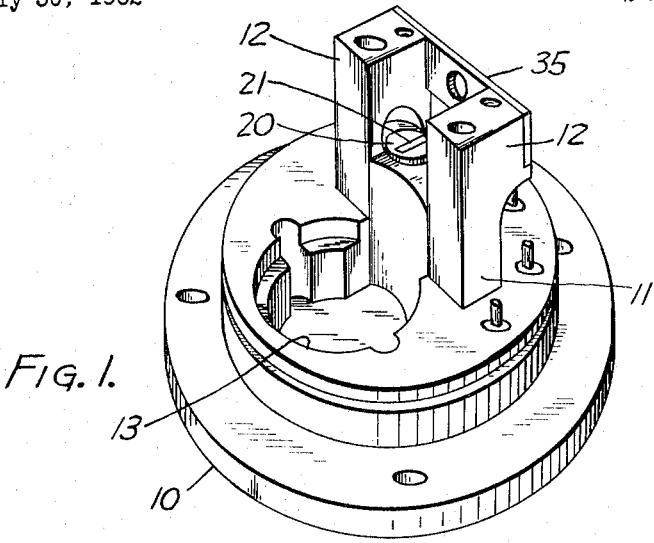
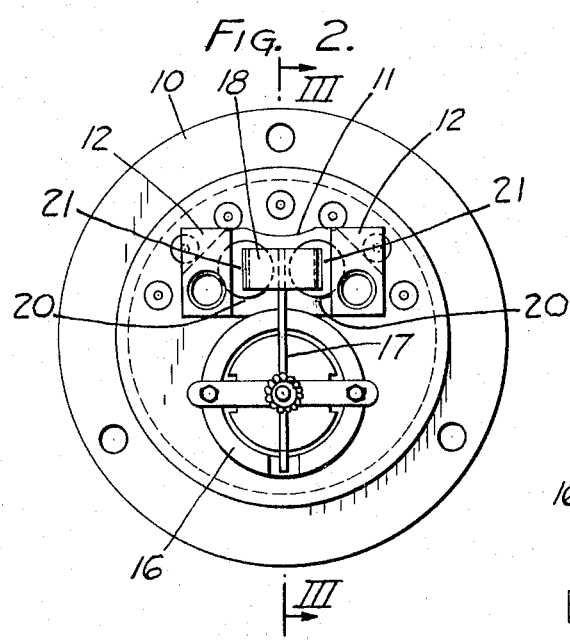
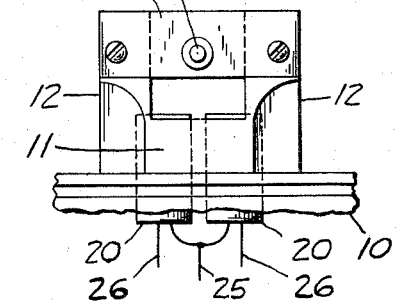
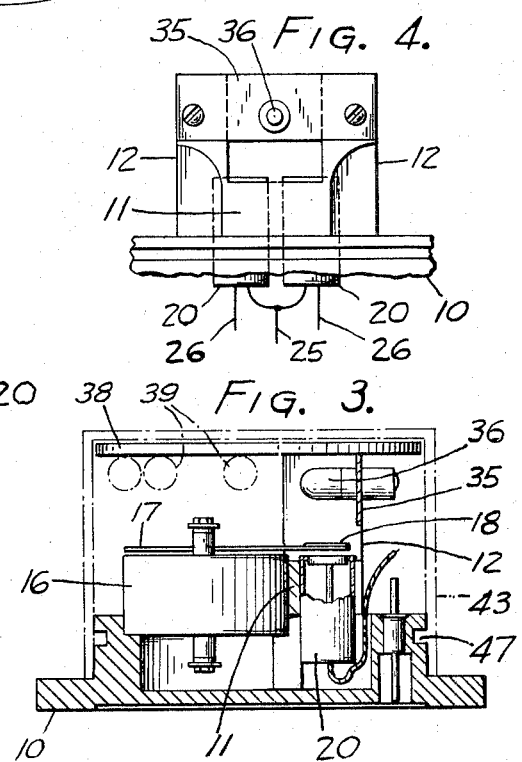
INVENTOR.
Walter J. Hirtreiter
BY Christel & Bean
ATTORNEYS Jan. 3, 1967 W. J. HIRTREITER 3,295,378
ACCELEROMETER
Filed July 30, 1962 2 Sheets-Sheet 2

INVENTOR.
Walter J. Hirtreiter
BY
Christel & Bean
ATTORNEYS

United States Patent Office 3,295,378
Patented Jan. 3, 1967

3,295,378
ACCELEROMETER
Walter J. Hirtreiter, 239 Norwalk Ave.,
Buffalo, N.Y. 14216
Filed July 30, 1962, Ser. No. 213,308
4 Claims. (Cl. 73—517)

This invention relates to accelerometers and particularly to an accelerometer wherein acceleration forces on a movable mass are detected by light sensitive electrical means.

The accelerometer of the present invention is so arranged that conditions of imbalance of the sensitive mass caused by positive or negative acceleration forces produce electromotive balance-restoring forces proportionate to the displacement effects of acceleration on the sensitive mass. Thus the apparatus is effective throughout a relatively wide range of acceleration rates and forces although the actual displacement of the sensitive mass is minute throughout the range of the instrument due to the feedback effect of restoring forces generated by tendencies of the sensitive mass to move from a medial force-balanced position.

In the particular instance disclosed herein by way of example, the use of opposed photosensitive devices which are normally balanced by substantially equal illumination of both devices affords a very sensitive and effective accelerometer mass displacement indicator and corrective force generating system which requires a minimum of corrective adjustment and calibration. Due to the balancing effect of the two opposed photosensitive devices conditions which normally subject the same to variations in electrical performance are automatically neutralized or balanced out. Performance-modifying influences which would normally throw a single photosensitive signal out of adjustment or distort the same to give an inconstant response under constant acceleration condition are thus avoided to a substantial extent.

Again referring particularly to the accelerometer shown herein by way of example, the use of photoconductive means inserted directly in the calibrating and balancing force generating circuitry eliminates the need for signal amplification, thus not only greatly simplifying the instrument but also eliminating numerous components needed for conventional amplification. Obviously such simplification and reduction in complexity eliminates many possible sources of trouble or inaccuracy.

The instrument of the present invention may be employed as an inclinometer or precision level measuring device, in addition to its primary use as an accelerometer, the general interchangeability of devices of this character for these analogous uses being known in the accelerometer art.

While exemplary embodiments of the principles of the present invention are illustrated in the drawings and described in the following specification, it is to be understood that such embodiments are for the purposes of setting forth the operating principles of the present invention and the scope of the invention is not limited to such exemplary embodiments or otherwise than as defined in the appended claims.

In the drawings:

FIG. 1 is a general perspective view of one form of the accelerometer of the present invention with the meter and other elements thereof removed to illustrate the general support structure of the instant embodiments;

FIG. 2 is a top plan view of the form of accelerometer which is shown fragmentarily in FIG. 1;

FIG. 3 is a cross-sectional view taken on the line III—III of FIG. 2;

FIG. 4 is a fragmentary elevational view of the upper portion of the structure of FIG. 3 taken at right angles to FIG. 3 as viewed from the right hand side of the latter;

Figure 5:
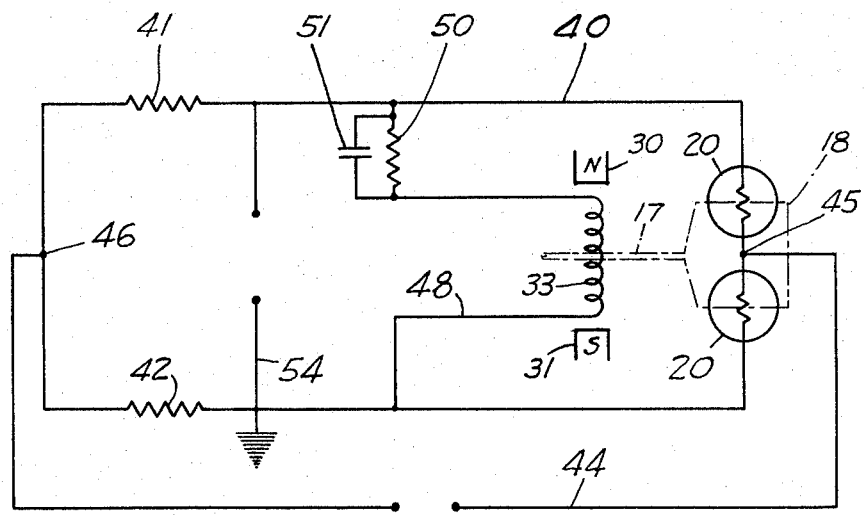
FIG. 5 is a wiring diagram of the accelerometer shown in FIGS. 1 through 4.

Like characters of reference denote like parts throughout the several figures of the drawings and, referring first to FIGS. 1 through 4, the numeral 10 designates a generally circular base member which has fixed thereto a support 11 which includes a pair of spaced upwardly extending posts 12. As best shown in FIG. 1, base member 10 is formed with a recess 13 in which is mounted a conventional zero center meter designated by the numeral 16. Such meters are available commercially and the meter contemplated herein is of the type known as a core type movement and has a pivoted normally centered indicator hand or pointer 17.

When the pointer or indicator needle 17 is in the zero center position illustrated in FIG. 2, its outer end lies centrally between the posts 12 and fixed to such outer end is a plate member 18 which serves as a light metering or light dividing plate, as will presently be more fully explained. Furthermore, the plate 18 serves as an inertia mass member which is subject to movements in a horizontal direction in the plane of the drawing as viewed in FIG. 2.

Support 11 has a pair of bore formation extending upwardly from its bottom end to receive a pair of similar photosensitive electric cells 20. It will be noted from FIGS. 2 and 4 that the bore formations which receive the photocells 20 are located and spaced in such manner that a major part of the upper end of each photocell 20 is exposed upwardly at opposite ends of the central space formed by the posts 12.

The photoelectric cells 20 are of the so-called photoconductive type which involve merely a single element with a pair of conductors leading from the opposite ends thereof. The photoconductive element may comprise various materials such as cadmium sulfide and cadmium selenide. The light-sensitive area at the end of each tube comprises a rectangular area as indicated by the rectangles designated 21 in FIGS. 1 and 2. One of the two conductors from each of the photocells 20 is connected to a conductor from the other as indicated more or less schematically at 25 in FIG. 4, whereby the cells 20 are connected in series. The other conductor from each photocell 20, designated 26 in FIG. 4, is connected in the accelerometer circuitry as shown in the wiring diagram, FIG. 5.

The meter unit includes a pair of opposed permanent magnet members designated 30 and 31 in FIG. 5 and an interposed winding 33. When the inertia plate or mass 18 is in medial position of zero acceleration no current flows through winding 33. Any deflection of mass 18 causes proportionate current through winding 33, in a manner which will presently appear, and causes winding 33 to exert a force-balancing magnetic force in opposition to the acceleration force. The winding designated 33 in the wiring diagram, FIG. 5 is incorporated in the meter unit 16.

No springs are employed in the meter unit so that the forces acting on the needle 17 are substantially entirely limited to the forces of acceleration and the restoring force-balancing electromagnetic forces of winding 33. The electrical lead to the meter rotor which carries the winding 33 is made as tenuous and flexible as is possible so as to impose as little mechanical restraint or bias as is practically feasible.

A plate member 35 attached across the upper ends of the posts 12 supports a lamp 36 which is located in direct vertical alignment with plate member 18 when the latter is in normal zero center position. It will thus be seen that the plate member 18 serves as a metering plate which divides the light from lamp 36 variably between the sensitive areas at the upper ends of photocells 20 according to the position of plate member 18 between the posts 12 as determined by deflections of the needle or pointer 17.

As shown in FIG. 3, a disc 38 of molded fibre or other insulating material is screwed to the upper ends of posts 12 and the underside thereof provides a mounting surface for various resistors and capacitors which are shown schematically in FIG. 5. In FIG. 3 the numeral 39 generally indicates a group of such components which may be variously arranged against the underside of disc 38 as desired. Furthermore, as shown in dot and dash lines at 43 in FIG. 3, a cover member fits securely over the upper portion of base member 10, the latter being grooved as at 47 to receive an O-ring packing to effectively seal the device against external influences.

Referring now to the wiring diagram, FIG. 5, the photoelectric cells 20 are connected in series in a loop circuit 40 which also includes, in series, resistances 41 and 42 which are of equal value in the present instance. It will be noted that these four resistances, namely the two photocells 20 and the resistances 41 and 42 thus form a four-arm balanced bridge. A direct current power supply 44 is connected as at 45 and 46 to the midpoint between the photocells 20 and the midpoint between the resistances 41 and 42, respectively.

The force balance winding 33 of the meter unit 16 is connected across this bridge circuit as by a conductor 48 and it will be noted that when the effective resistances of the photocells 20 are equal no current will flow through conductor 48 and winding 33. However, when the plate member 18 indicated in dot and dash lines in the wiring diagram moves upwardly as viewed in the diagram, it lessens the light reaching the upper photocell 20 and increases the light which reaches the lower photocell 20. This increases the resistance of the upper photocell and reduces the resistance of the lower photocell and causes direct current to flow upwardly through conductor 48 and winding 33 as viewed in FIG. 5.

The restoring coil 33 is so wound with respect to the north and south poles 30 and 31 of the permanent magnet portion of the meter that under acceleration conditions current upwardly through the coil 33 as viewed in FIG. 5 exerts a force on the pointer 17 and flag 18 which opposes the displacing force of acceleration and thus tends to urge the same downwardly as viewed in FIG. 5. At a given constant acceleration the mass will remain stabilized in a correspondingly displaced position with respect to the zero center position.

When the respective resistances of the photocells are altered by deflection of the mass or seismic element under the influence of acceleration, the resultant electrical energy is fed back to winding 33 which develops an electromagnetic force equal to and opposing the acceleration-induced force on the seismic element. This servo action results in a finite deflection of the mass or seismic element under which a force balance is caused to exist.

The conductor 48 which is connected across the aforesaid bridge and includes the restoring coil or force balance winding 33 also includes a resistance 50 and a capacitance 51 connected about the same. The resistance 50 is normally many times greater than the resistance of winding 33 and is selected to determine the range of the instrument. The capacitance connection 51 about the resistance 50 is provided for stabilization.

An output conductor 54 is connected across the bridge circuit, that is across the loop conductor 40, in parallel with the conductor 48 to provide an output signal for connection with a galvanometer type of indicating instrument which may be calibrated in any desired manner or for connection to circuitry for effecting controls which are to be varied or adjusted in accordance with changing acceleration conditions.

Figure 6:
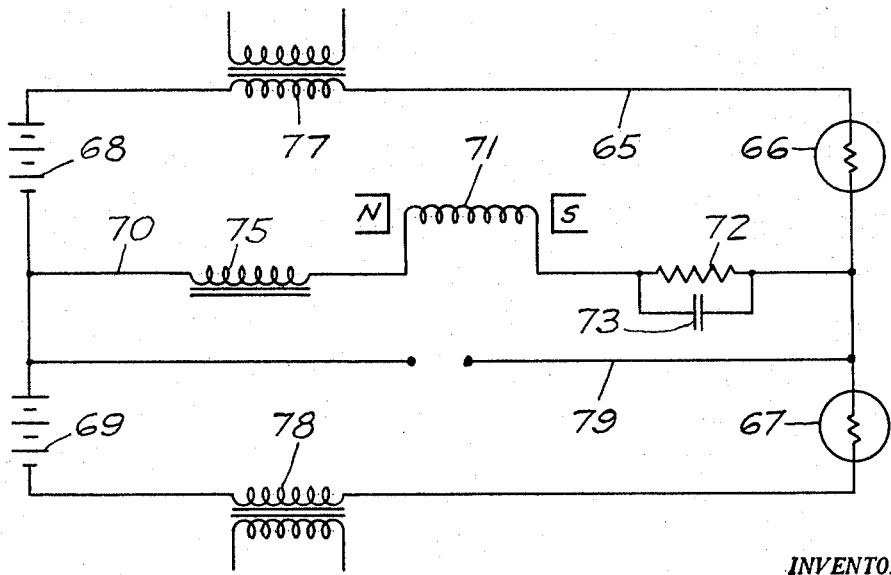
FIG. 6 is a wiring diagram of a modified form of accelerometer circuitry arranged in accordance with the principles of the present invention.

While the basic operation of the present instrument is a direct current operation, it is sometimes desired that an alternating current output be developed for extraneous reasons. FIG. 6 shows a circuit arrangement which is similar in principal to that of FIG. 5 but modified to produce an A.C. output signal. In FIG. 6 a loop conductor 65 contains normally balanced photocells 66 and 67 in series and, also in series, batteries 68 and 69 which provide the D.C. power supply for loop 65 and also comprise balanced resistances analogous to the resistances 41 and 42 of the previous modification.

This arrangement also forms a four-arm balanced D.C. bridge circuit and a conductor 70 connected across the circuit includes a winding 71 analogous to the winding 33 of FIG. 5 for the same purpose, that is to develop a restoring force on pointer 17 and plate member 18 in proportion to the deflecting forces acting thereon due to acceleration. The resistance 72 and capacitance 73 are analogous to the resistance 50 and capacitance 51 of the previous embodiment and a winding 75 forms a choke coil which provides an inductance across which alternating current may develop.

As indicated at 77 and 78 in FIG. 6, the secondary windings of alternating current transformers are connected in series in loop circuit 65 to superimpose an alternating current potential which produces an alternating current output signal across a conductor 79 which is connected parallel to the force balance winding conductor 70.

I claim:

1. In an accelerometer, a pair of spaced photoconductive elements, means normally illuminating said photoconductive element substantially equally, a mass disposed between said illuminating means and said elements and normally disposed medially with respect to said elements, said mass being movable in opposite directions from such medial position in response to positive and negative acceleration forces to vary the proportionate distribution of light as between said photoconductive elements, a D.C. power supply and parallel conductors in circuit therewith, one of said photoconductive elements and a resistance being connected directly in series with each of said conductors, means connected across said conductors between the photoconductive element and said resistance of each conductor for indicating deflections of said mass as evidenced by variations in proportionate illumination of said photoconductive elements, a second connection across said conductors between the photoconductive element and the resistance of each and electromagnetic means therein acting against said mass, whereby movements of said mass produce electromagnetic restoring forces thereagainst opposite in direction to the deflection of said mass and proportionate to the degree of deflection.

2. In an accelerometer, a pair of spaced photoconductive elements, a light source acting upon said elements, a mass disposed between said light source and said elements and normally disposed medially with respect to said elements, said mass being movable in opposite directions from such medial position in response to positive and negative acceleration forces to vary the distribution of light as between said photoconductive elements, a four-arm balanced bridge circuit and a D.C. power supply connected thereto, said photoconductive elements being connected in two arms of said bridge, equal resistors in the other two arms of said bridge, an output signal connection across said bridge, and force balancing magnetic means likewise connected across said bridge in parallel with said output signal means, said magnetic means being adapted to apply opposing restoring forces against said mass upon movement of the latter from normal position.

3. In an accelerometer, a pair of spaced photoconductive elements, means normally illuminating said photoconductive elements substantially equally, a mass disposed between said illuminating means and said elements and normally disposed medially with respect to said elements, said mass being movable in opposite directions from such medial position in response to positive and negative acceleration forces to vary the proportionate distribution of light as between said photoconductive elements, a four-arm balanced bridge circuit and a D.C. power supply connected thereto, said photoconductive elements being connected directly in two arms of said bridge, substantially equal resistances in the other two arms of said bridge, an output signal connection across said bridge, and force balancing magnetic means likewise connected across said bridge in parallel with said readout means whereby said magnetic means is energized in magnitude and direction according to deflections of said mass to apply restoring forces against said mass upon movement of the latter from medial position under acceleration forces.

4. In an accelerometer, a mass normally held in a medial position by magnetic force means and movable in opposite directions in response to positive and negative acceleration, a light source at one side of said mass in alignment therewith along a perpendicular to the direction of movement of said mass, a pair of photoconductive elements located at the opposite side of said mass and spaced at opposite sides of said perpendicular in the direction of movement of said mass, whereby said mass in its medial position divides light from said source between said photoconductive elements and upon movement under acceleration forces varies the ratio of light distribution as between said elements, magnetic means directly in circuit with said photoconductive elements for applying restoring forces to said mass upon deflection thereof from medial position under acceleration forces, the restoring force of said magnetic means being controlled as to direction and magnitude by the ratio of light distribution to said photoconductive elements.

References Cited by the Examiner
UNITED STATES PATENTS

| | | | |
|---|---|---|---|
| Re. 20,476 | 8/1937 | Wilson | 250—231 |
| 1,638,103 | 8/1927 | Roucka | 250—231 |
| 2,100,934 | 11/1937 | Berges | 250—220 |
| 2,304,191 | 12/1942 | Smith | 250—231 |
| 2,362,135 | 11/1944 | James | 33—206.5 |
| 2,498,997 | 2/1950 | McLean | 73—517 |
| 2,505,420 | 4/1950 | McCrary | 250—231 |
| 2,685,064 | 7/1954 | Bergen | 250—231 |
| 2,721,277 | 10/1955 | Boundy | 250—220 |
| 2,899,190 | 8/1959 | Driver | 73—517 |
| 3,057,195 | 10/1962 | Bentley | 73—141 |
| 3,091,972 | 6/1963 | Johnston | 73—517 |
| 3,128,386 | 4/1964 | Hughes | 250—237 |

RICHARD C. QUEISSER, *Primary Examiner.*

ROBERT L. EVANS, *Examiner.*

JAMES J. GILL, *Assistant Examiner.*